Patented Mar. 11, 1952

2,588,899

UNITED STATES PATENT OFFICE 2,588,899

STABILIZED COMPOSITIONS CONTAINING HIGH MOLECULAR WEIGHT HALOGENATED MATERIALS

Heino Tonnis Voorthuis and Christiaan Pieter van Dijk, Amsterdam, Netherlands, assignors to Shell Development Company, San Francisco, Calif., a corporation of Delaware No Drawing. Application August 23, 1950, Serial No. 181,108. In the Netherlands September 2, 1949

10 Claims. (Cl. 260—45.7)

This invention relates to stabilization of high molecular weight halogenated organic material against deteriorating effects of heat and light by incorporation therewith of a combination of substances. In particular the invention is concerned with stabilization of polymers of vinyl chloride.

Halogen-containing organic materials of high molecular weight, such as polymers and copolymers of vinyl chloride, are usually fabricated into useful articles by application of heat in milling and/or molding operations. However, those fabricating operations employing heat tend to decompose the halogen-containing material so that it becomes discolored, as well as adversely affecting the physical properties thereof. Moreover, exposure of the halogen-containing material to light, especially sunlight which is rich in ultraviolet radiation, also causes discoloration as well as physical deterioration of the halogen-containing material. Various substances have been added to retard or prevent such discoloration and deterioration, but the need for improvement in this respect still remains.

We have now discovered that excellent stabilization of halogen-containing organic substances of high molecular weight is obtained by incorporation therewith of a combination of three different substances. These three substances co-act in unexpected manner to achieve better stabilization than with any one or two thereof. In fact, one of the substances, an oxidation inhibitor, has itself virtually no stabilizing action on halogen-containing materials and at times is more harmful in this respect than when absent. Nevertheless, by using the three substances in combination a very powerful and widely applicable stabilizing action is achieved.

The invention is a composition of matter stabilized against deteriorating effects of heat and light comprising essentially a halogen-containing organic substance having a molecular weight above 2000 in admixture with a stabilizing amount of three different substances which are (1) an acid-neutralizing compound, (2) an oxidation inhibitor, and (3) a urea compound represented by the formula

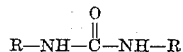

wherein R is hydrogen or a phenyl radical containing a nuclear-substituted sulfur-free polar group, at least one R being said substituted phenyl radical.

The high molecular weight halogen-containing material which is the principal constituent of the composition may be any substance containing an appreciable proportion of halogen and a molecular weight of at least 2000. No particular upper limit to the molecular weight is necessary to realize the advantages of the invention so long as it is above 2000. The stabilization is obtained with the halogen-containing organic materials having molecular weights of about 50,000, 100,000, 150,000 or higher. While it is preferred to employ the principle of the invention for the purpose of stabilizing chlorine-containing organic materials, substances containing other halogens such as bromine, fluorine or iodine are also suitable. In general, the halogen atom or atoms are linked directly to a carbon atom which in turn is linked to no other atoms than carbon, hydrogen or other halogen atoms which may be the same or different from the first. Among the materials stabilized are polyvinyl chloride, after-chlorinated polyvinyl chloride, copolymers of vinyl chloride with various polymerizable compounds containing olefinic double bonds such as vinyl acetate, vinyl chloride, acrylonitrile, maleic anhydride, styrene, etc.; halogenated polyolefins such as chlorinated polyethylene, brominated polyisobutylene, etc.; polymers of chloroprene as well as copolymers thereof with other polymerizable unsaturated compounds such as those named above; halogenated products of fats, train oils, waxes, and the high-boiling hydrocarbons and the like. In general, the stabilizing influence is particularly suitable with substances containing at least 10% halogen, particularly those with up to 75% halogen. Excellent results are obtainable upon stabilizing polyvinyl chloride as well as copolymers of vinyl chloride with up to 15% vinyl acetate.

A large variety of urea compounds are suitable for use in the composition of the invention. In general, this organic stabilizing compound is a substituted urea wherein one to two of the amido groups of urea has a single hydrogen atom thereon replaced by a substituted phenyl radical, the phenyl substituent being a member of the class consisting of the polar radicals represented by the formulas RO—, NO$_2$—, H$_2$N—, halogen, RHN—, R$_2$N—, ROOC—, and RCO—, wherein R is a hydrocarbon radical of say up to ten carbon atoms, such as an alkyl, alkenyl, aryl, or aralkyl group of which methyl, ethyl, isopropyl, hexyl, decyl, allyl, crotyl phenyl, tolyl and benzyl radicals are typical. Representative substituted ureas suitable for use in the invention include para-chlorophenyl urea, ortho-chlorophenyl urea, para-carbethoxyphenyl urea, ortho-methoxyphenyl urea, para-ethoxyphenyl urea, ortho,para-dinitrophenyl urea, para-diethylaminophenyl urea, 4,4'-dimethoxy carbanilide, 4,4'-diethoxy carbanilide, and 4,4'-dichlorocarbanilide. The polar groups may be linked to any of the nuclear carbon atoms of the phenyl group. While the compounds usually have the substituents linked to para or ortho carbon atoms because of availability of compounds used to prepare the urea derivatives, those containing meta substituents are equally suitable. In practice of the invention it is customary to use but a single urea compound. If desired, however, a mixture of different urea compounds including isomeric mixtures are suitable.

The acid-neutralizing compound is an essential component of the stabilizer mixture. Although it has been found that an alkali metal carbonate, particularly sodium or potassium carbonate, is especially suitable as the acid-neutralizing compound, any other alkaline or basic-acting substance may be used for this purpose. These include bi-carbonates and hydroxides of alkali metals like sodium, potassium and lithium, or alkaline earth metals like calcium and magnesium, as well as magnesium oxide, basic phosphates such as di- or tri-sodium phosphate and organic amines such as diethyl amine, benzyl amine, triethylene diamine, and phenylene diamine.

The oxidation inhibitor employed in the composition is any of the many such antioxidants recognized in the rubber industry, including phenols such as hydroquinone, para-octylphenol, menthylphenol, and hydroquinone monobenzyl ether (agerite Alba), as well as aromatic amines, particularly secondary aromatic amines such as diphenyl amine, N-phenyl-beta-naphthyl amine, N,N'-diphenylethylene diamine, N,N'-di-orthotolylethylene diamine, and di-beta-naphthyl-para-phenylene diamine. If desired, two or more of the oxidation inhibitors as well as two or more of the acid-neutralizing compounds may be used in the composition of the invention.

With respect to the proportion of the stabilizer substances employed in the composition suitable amounts of the acid-neutralizing compounds lie between 0.0002 and 0.02, particularly between 0.001 and 0.01 gram equivalents per 100 grams of the halogen-containing organic substance. When the preferred acid-neutralizing compound, sodium carbonate, is used, the proportion is from about 0.05% to 1% based on the weight of halogen-containing organic substance. The proportion of each of the aryl-urea derivative and the oxidation inhibitor is between 0.001 and 1, particularly between 0.005% and 0.5% by weight, based on the halogen-containing organic substance. While the foregoing ranges of proportion are especially suitable, quantities outside these limits may be used if desired. Optimum proportions of the three materials will depend upon a variety of factors, such as the particular components of the stabilizer as well as the halogen-containing organic substance.

The compositions of the invention may contain in addition to the halogenated organic material of high molecular weight and the combination of stabilizing substances, any other suitable material desired such as plasticizers like dioctyl phthalate, tricresyl phosphate, chlorinated diphenyl and dibutyl sebacate, colorants, dyes, pigments, fillers, and/or other stabilizers such as naphthyl glycidyl ether, etc. While in general it may be most convenient to incorporate the various materials together on a heated roll mill, other conventional and well known methods may be used. The additives can be added as such, in solution, or in the form of a suspension both during the preparation or processing of the polymers to be stabilized.

In order to illustrate various specific embodiments of the invention as well as representative results when all three components of the stabilizer are not used, the following examples are given.

The influence of various stabilizers and combinations thereof was determined with compositions consisting by weight of 100 parts of polyvinyl chloride having a molecular weight of about 100,000, 40 parts of dioctyl phthalate and 0.1 part of sodium carbonate in foils rolled from these compositions which were exposed to heat.

The compositions were prepared by mixing the ingredients in a mortar and then milling the mixtures on a heated roll mill for three minutes at 140° C. so that foils with a thickness of 0.5 mm. were produced. Strips of these were hung in a drying oven in air with the temperature maintained at 160° C. One strip was removed at successive intervals of fifteen minutes. After being preheated for two minutes at 160° C., the strips were compressed for one minute at the same temperature to a sheet with a thickness of 1.2 mm.

The color of the pressed sheets was determined with incident light by comparison with the slides of a Lovibond Tintometer.

In the table below the time of heating in minutes necessary for various compositions to attain a color of 4 or 10 is shown. The percentages are based on the weight of polyvinyl chloride without the plasticizer.

*Table*

| Stabilizer | Number of Minutes of Heating Necessary for Attainment of— | |
|---|---|---|
| | Color 4 | Color 10 |
| None | 10 | 25 |
| 0.2% p-chlorophenyl urea | 33 | 42 |
| 0.2% p-chlorophenyl urea+0.005% diphenyl amine | 60 | 85 |
| 0.2% p-chlorophenyl urea+0.01% diphenyl amine | 65 | >90 |
| 0.2% p-chlorophenyl urea+0.02% diphenyl amine | 65 | >90 |
| 0.02% diphenyl amine | 9 | 28 |
| 0.2% p-chlorophenyl urea | 33 | 42 |
| 0.2% p-chlorophenyl urea+0.01% octylphenol | 65 | 90 |
| 0.2% p-chlorophenyl urea+0.05% octylphenol | 65 | 90 |
| 0.05% octylphenol | 9 | 26 |
| 0.2% p-chlorophenyl urea | 33 | 42 |
| 0.2% p-chlorophenyl urea+0.01% menthylphenol | 65 | 90 |
| 0.2% p-chlorophenyl urea+0.05% menthylphenol | 65 | 90 |

Table—Continued

| Stabilizer | Number of Minutes of Heating Necessary for Attainment of— | |
|---|---|---|
| | Color 4 | Color 10 |
| 0.05% menthylphenol | 8 | 30 |
| 0.2% p-chlorophenyl urea | 33 | 42 |
| 0.2% p-chlorophenyl urea+0.01% Agerite Alba | 50 | >90 |
| 0.2% p-chlorophenyl urea+0.05% Agerite Alba | 50 | >90 |
| 0.05% Agerite Alba | 7 | 28 |
| 0.2% p-chlorophenyl urea | 33 | 42 |
| 0.2% p-chlorophenyl urea+0.01% hydroquinone | 60 | 75 |
| 0.2% p-chlorophenyl urea+0.05% hydroquinone | 45 | >90 |
| 0.01% hydroquinone | 25 | 35 |
| 0.05% hydroquinone | 8 | 23 |
| 0.2% p-chlorophenyl urea | 33 | 42 |
| 0.2% p-chlorophenyl urea+0.05% N-phenyl-β-naphthyl amine | 42 | 90 |
| 0.05% N-phenyl-β-naphthyl amine | 9 | 26 |
| 0.2% carbethoxyphenyl urea | 37 | 50 |
| 0.2% carbethoxyphenyl urea+0.02% diphenyl amine | 73 | 85 |
| 0.02% diphenyl amine | 9 | 28 |
| 0.2% o-ethoxyphenyl urea | 30 | 60 |
| 0.2% o-ethoxyphenyl urea+0.02% diphenyl amine | 47 | 90 |
| 0.02% diphenyl amine | 9 | 28 |
| 0.2% N,N'-di(4-chlorophenyl)urea | 10 | 35 |
| 0.2% N,N'-di(4-chlorophenyl)urea+0.02% diphenyl amine | 18 | 81 |
| 0.02% diphenyl amine | 9 | 28 |

We claim as our invention:

1. A composition of matter stabilized against deteriorating effects of heat and light comprising essentially a halogen-containing organic substance having a molecular weight above 2000 in admixture with a stabilizing amount of (1) an acid-neutralizing compound, (2) an oxidation inhibitor different from said compound, and (3) a compound represented by the formula

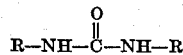

wherein R is a member of the group consisting of hydrogen and a phenyl radical containing a nuclear-substituted sulfur-free polar group, at least one R being said substituted phenyl radical, said polar group being a member of the class consisting of R'O—, NO₂—, halogen—, R'HN—, R'N₂—, R'OOC—, and R'CO—, wherein R' is a hydrocarbon radical of up to 10 carbon atoms.

2. A composition comprising essentially an organic substance having a molecular weight above 2000 and containing 10% to 75% of halogen in admixture with three different materials comprising (1) 0.0002 to 0.2 gram equivalent of inorganic base per 100 grams of said substance, (2) 0.001 to 1% by weight based on said substance of an oxidation inhibitor, and (3) 0.001 to 1% by weight based on said substance of a urea compound represented by the formula

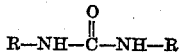

wherein R is a member of the group consisting of hydrogen and a phenyl radical containing a nuclear-substituted sulfur-free polar group, at least one R being said substituted phenyl radical, said polar group being a member of the class consisting of R'O—, NO₂—, halogen—, R'HN—, R'N₂—, R'OOC—, and R'CO—, wherein R' is a hydrocarbon radical of up to 10 carbon atoms.

3. A composition as defined in claim 2 wherein component (1) is an alkali metal carbonate and is present in amount of 0.001 to 0.01 gram equivalent per 100 grams of the halogen-containing organic substance.

4. A composition of matter comprising essentially a polymer of vinyl chloride with molecular weight above 2000 and containing at least 10% chlorine in admixture with (1) about 0.05 to 1% of sodium carbonate, (2) 0.01 to 1% of chlorophenyl urea, and (3) 0.001 to 1% of an oxidation inhibitor, said percentages being based on the weight of said polymer.

5. A composition as defined in claim 4 wherein the oxidation inhibitor is diphenyl amine.

6. A composition as defined in claim 4 wherein the oxidation inhibitor is a phenol.

7. A composition as defined in claim 4 wherein the oxidation inhibitor is octylphenol.

8. A composition as defined in claim 4 wherein the oxidation inhibitor is menthylphenol.

9. A composition as defined in claim 4 wherein the oxidation inhibitor is the monobenzyl ether of hydroquinone.

10. A composition as defined in claim 4 wherein the oxidation inhibitor is hydroquinone.

HEINO TONNIS VOORTHUIS.
CHRISTIAAN PIETER VAN DIJK.

REFERENCES CITED

The following references are of record in the file of this patent:

UNITED STATES PATENTS

| Number | Name | Date |
|---|---|---|
| 2,336,464 | Buck et al. | Dec. 14, 1943 |
| 2,365,400 | Fikentscher | Dec. 19, 1944 |
| 2,555,167 | Van Dijk et al. | May 29, 1951 |

OTHER REFERENCES

Modern Plastics, December 1949, page 116.